(12) United States Patent
Beylin et al.

(10) Patent No.: US 12,413,318 B2
(45) Date of Patent: Sep. 9, 2025

(54) OVER-THE-AIR AUDIO QUALITY TESTING REMOTE FROM TESTING SITE

(71) Applicant: Spirent Communications, Inc., San Jose, CA (US)

(72) Inventors: Mikhail Beylin, Morgan Hill, CA (US); Ronald Royer, Grapevine, TX (US); Dat Phan, San Jose, CA (US); Ehab Bahjat, Rockwall, TX (US); In Seo, Fremont, CA (US)

(73) Assignee: Spirent Communications, Inc., San Jose, CA (US)

( * ) Notice: Subject to any disclaimer, the term of this patent is extended or adjusted under 35 U.S.C. 154(b) by 357 days.

(21) Appl. No.: 18/127,593

(22) Filed: Mar. 28, 2023

(65) Prior Publication Data
US 2024/0014909 A1 Jan. 11, 2024

Related U.S. Application Data

(63) Continuation-in-part of application No. 17/858,013, filed on Jul. 5, 2022, now Pat. No. 12,200,516.

(51) Int. Cl.
*H04B 17/15* (2015.01)
(52) U.S. Cl.
CPC ................. *H04B 17/191* (2023.05)
(58) Field of Classification Search
CPC .. H04B 17/191; H04W 24/06; H04M 3/2236; H04M 3/323; H04M 3/2281; G10L 25/60; G10L 25/69
See application file for complete search history.

(56) References Cited

U.S. PATENT DOCUMENTS

| 5,551,064 A | 8/1996 | Nobbe et al. |
| 6,201,853 B1 | 3/2001 | Butler et al. |

(Continued)

OTHER PUBLICATIONS 3.5 mm Headset: Accessory Specification, Android Open Source Project, 5 pages, ("https://source.android.com/devices/accessories/headset/plug-headset-spec#functions" <accessed on Nov. 25, 2019>).

(Continued)

*Primary Examiner* — Dominic E Rego
(74) *Attorney, Agent, or Firm* — Haynes Beffel & Wolfeld LLP; Ernest J Beffel, Jr.; Jason Liao

(57) ABSTRACT

The technology includes a method, computer medium, and system for remote testing over-the-air (OTA) audio quality using a test platform positioned at core network, the test platform comprising first and second cellular handsets and bridging logic that interconnects, controls, and bridges the first and second cellular handsets. The method includes triggering the bridging logic. The bridging logic initiates a first call over the first cellular handset to a tester, and initiates a second call over the second cellular handset to a destination, wherein the second call is initiated over-the-air. The bridging logic and the first and second cellular handsets are positioned in a location that causes routing by a cellular network of the first call over a segment under test. The bridging logic bridging audio between the first and the second calls, including relaying audio. The tester determines that the second call was established based on the relayed audio.

20 Claims, 10 Drawing Sheets

(56) References Cited

U.S. PATENT DOCUMENTS

| | | | | |
|---|---|---|---|---|
| 6,337,858 | B1* | 1/2002 | Petty | H04M 7/003 |
| | | | | 370/410 |
| 6,385,646 | B1* | 5/2002 | Brown | H04M 7/003 |
| | | | | 379/93.12 |
| 6,577,714 | B1* | 6/2003 | Darcie | H04L 67/52 |
| | | | | 379/93.17 |
| 6,728,612 | B1 | 4/2004 | Carver et al. | |
| 7,181,210 | B2* | 2/2007 | Zabawskyj | H04W 88/14 |
| | | | | 455/433 |
| 7,995,516 | B2* | 8/2011 | Zhou | H04W 92/02 |
| | | | | 455/445 |
| 8,102,986 | B1* | 1/2012 | McClintock | H04M 1/72436 |
| | | | | 370/352 |
| 8,150,015 | B1* | 4/2012 | Whitney | H04M 3/563 |
| | | | | 379/202.01 |
| 8,868,028 | B1 | 10/2014 | Kaltsukis | |
| 9,167,079 | B1 | 10/2015 | Capecci et al. | |
| 9,398,466 | B1 | 7/2016 | Joung et al. | |
| 9,774,746 | B1* | 9/2017 | Sennett | H04M 7/124 |
| 10,097,981 | B1 | 10/2018 | Talaganov et al. | |
| 10,212,286 | B2* | 2/2019 | Jayadevan | H04M 3/42008 |
| 10,791,221 | B1 | 9/2020 | Vislocky | |
| 10,805,462 | B1 | 10/2020 | Ginter et al. | |
| 10,841,413 | B1 | 11/2020 | Pentakota et al. | |
| 2002/0131604 | A1* | 9/2002 | Amine | H04R 29/004 |
| | | | | 381/58 |
| 2005/0043017 | A1* | 2/2005 | Esposito | H04W 4/00 |
| | | | | 455/414.1 |
| 2007/0019769 | A1 | 1/2007 | Green et al. | |
| 2007/0153088 | A1 | 7/2007 | Hales et al. | |
| 2007/0177680 | A1 | 8/2007 | Green et al. | |
| 2007/0291931 | A1* | 12/2007 | DeMent | H04M 3/42017 |
| | | | | 379/418 |
| 2008/0037751 | A1* | 2/2008 | Aldrey | H04M 3/56 |
| | | | | 379/202.01 |
| 2008/0095333 | A1* | 4/2008 | Tudor | H04L 12/1818 |
| | | | | 704/260 |
| 2008/0096588 | A1* | 4/2008 | Waytena | H04L 61/4535 |
| | | | | 709/206 |
| 2008/0159501 | A1 | 7/2008 | Cai | |
| 2009/0003316 | A1* | 1/2009 | Lee | H04L 12/5692 |
| | | | | 370/352 |
| 2009/0042539 | A1* | 2/2009 | Jiang | H04M 15/00 |
| | | | | 455/408 |
| 2009/0144068 | A1* | 6/2009 | Altberg | G06Q 30/02 |
| | | | | 705/342 |
| 2009/0147778 | A1* | 6/2009 | Wanless | H04M 7/0054 |
| | | | | 455/466 |
| 2009/0207978 | A1 | 8/2009 | Oldham et al. | |
| 2010/0048191 | A1* | 2/2010 | Bender | H04M 15/00 |
| | | | | 455/414.1 |
| 2010/0091761 | A1* | 4/2010 | Arnaud | H04L 12/66 |
| | | | | 370/352 |
| 2010/0135474 | A1 | 6/2010 | Smith | |
| 2014/0344874 | A1 | 11/2014 | Olsen | |
| 2016/0173693 | A1* | 6/2016 | Spievak | G06Q 30/0269 |
| | | | | 379/265.09 |
| 2017/0104527 | A1 | 4/2017 | Sinde | |
| 2017/0104713 | A1* | 4/2017 | Agarwal | H04L 67/02 |
| 2017/0141845 | A1 | 5/2017 | Totten et al. | |
| 2018/0149687 | A1 | 5/2018 | Backus et al. | |
| 2019/0007806 | A1* | 1/2019 | Chu | H04M 3/42059 |
| 2019/0116506 | A1 | 4/2019 | Bendlin et al. | |
| 2019/0280438 | A1 | 9/2019 | German et al. | |
| 2019/0280504 | A1 | 9/2019 | Lee et al. | |
| 2019/0297503 | A1 | 9/2019 | Traynor et al. | |
| 2019/0335298 | A1 | 10/2019 | Mbonye et al. | |
| 2020/0035247 | A1 | 1/2020 | Boyadjiev et al. | |
| 2021/0021979 | A1 | 1/2021 | Chiang | |
| 2021/0233541 | A1 | 7/2021 | Chen et al. | |
| 2023/0064462 | A1* | 3/2023 | Santhar | H04M 3/562 |

OTHER PUBLICATIONS 3.5 mm Headset Jack: Device Specification, Android Open Source Project, 4 pages, ("https://source.android.com/devices/accessories/headset/jack-headset-spec.html#software_mapping" <accessed on Nov. 25, 2019>).

Spirent Landslide™ E10 Data Sheet, Spirent Communications, Inc., Oct. 2018, 4 pages.

U.S. Appl. No. 16/733,126, filed Jan. 2, 2020, U.S. Pat. No. 10,841,413, Nov. 17, 2020, Granted.

U.S. Appl. No. 18/127,590, filed Mar. 28, 2023, 20240015245, Jan. 11, 2024, Published.

U.S. Appl. No. 18/127,595, filed Mar. 28, 2023, 20240015536, Jan. 11, 2024, Published.

"NENA i3 Standard for Next Generation 9-1-1, NENA-STA-010. 3b-2021", National Emergency No. Association, Inc., Oct. 7, 2020, 673 pages.

Green, "FCC Workshop E911 Phase II Location Accuracy Overview", Sprint, 13 pages (downloaded from (https://transition.fcc.gov/bureaus/pshs/911/Phase%202/Workshop_11_2013/Sprint_No2013_FINAL.pdf Sprint_No2013_FINAL)).

UserPlane Location Protocol v2.0.4, Section 5.1.15 Emergency Services Location Requests, Open Mobile Alliance, Dec. 13, 2018, pp. 107-112.

UserPlane Location Protocol v2.0.4, 6.1.5 Authentication Mechanisms applicable to an E-SLP, Open Mobile Alliance, Dec. 13, 2018, pp. 203-204.

FCC Fact Sheet, Implementing Kari's Law and Section 506 of Ray Baum's Act, Report and Order—PS Docket Nos. 18-261 and 17-239, and GN Docket No. 11-117, Jul. 11, 2019, 163 pgs.

Ray et al., Alternative solutions for new E911 rules in 2020, FreePBX.com (Sangoma Technologies), 5 pgs, (downloaded Mar. 16, 2022 from https://community.freepbx.org/t/alternative-solutions-for-new-e911-rules-in-2020/64355).

Public Law 115-127, 115th Congress, Amendment 47 USC Section 609—Kari's Law Act of 2017, Feb. 16, 2018, 2 pgs.

UserPlane Location Protocol v2.0.5, Section 5.1.12 Notification/Verification based on current location, Open Mobile Alliance, Oct. 28, 2019, pp. 88-89.

"The E-model: a computational model for use in transmission planning", International Telecommunication Union (ITU), ITU-T Rec. G. 107, Jun. 2015, 30 pages.

Ray et al, Alternative solutions for new E911 rules in 2020, FreePBX.com (Sangoma Technologies), 5 pgs, (downloaded Mar. 16, 2022 from https://community.freepbx.org/t/alternative-solutions-for-new-e911-rules-n-2020/64355).

UserPlane Location Protocol v2.0.5, Open Mobile Alliance, Oct. 28, 2019, 403 pages.

Landslide E10 Datasheet, Spirent Communciations, Inc., Oct. 2018, 4 pages.

"The E-model: a computational model for use in transmission planning", Series G: Transmission Systems and Media, Digital Systems and Networks, Telecommunication Standardization Sector of ITU, G.107, Jun. 2015, 30 pages.

* cited by examiner

OVER-THE-AIR AUDIO QUALITY TESTING REMOTE FROM TESTING SITE

RELATED APPLICATIONS

This application is a continuation-in-part of U.S. application Ser. No. 17/858,013, titled "E911 Backhaul Routing Tests Remote from Coverage Area," filed on 5 Jul. 2022.

This application is related to the following contemporaneously filed applications:

U.S. application Ser. No. 18/127,590, titled "Transport Audio Quality Testing Remote From Testing Site," filed 28 Mar. 2023; and U.S. application Ser. No. 18/127,595, titled "Inter-Core Transport Audio Quality Testing Remote from Testing Site," filed 28 Mar. 2023.

INCORPORATIONS BY REFERENCE

The following are incorporated by reference for all purposes as if fully set forth here:

U.S. application Ser. No. 16/733,126, Systems and Methods for Using an Audio Cross-connect Cable for Remote Mobile Device Testing, filed on 2 Jan. 2020, now U.S. Pat. No. 10,841,413 issued on 17 Nov. 2020.

Spirent, "Data Sheet: Spirent Landslide™ E10—Small Form Factor, Mobile Core, Wi-Fi, Diameter, and IMS Test System," date unknown [captured by Archive.org from hxxps://www.spirent.com/products/core-network-test-5g-lte-ims-wifi-diameter-landslide on Nov. 11, 2019].

Open Mobile Alliance (OMA), "UserPlane Location Protocol" (v2.0.5), published on 28 Oct. 2019, p 88-89.

International Telecom Union (ITU) "The E-model: a computational model for use in transmission planning" ITU-T Rec. G.107, June 2015.

FIELD OF TECHNOLOGY

The technology disclosed relates to audio testing in telecommunications, such as voice over long-term evolution (VoLTE), fourth-generation mobile networks (4G) and fifth-generation mobile networks (5G) for high-speed wireless communication for mobile phones. More specifically, the technology relates to remote testing of telephone transport. The test verifies the quality of transmitted voice.

ACRONYMS

Acronyms used in this disclosure are identified the first time that they are used. These acronyms are terms of art, often used in standards documents. Except where the terms are used in a clearly and distinctly different sense than used in the art, we adopt the meanings found in the standards. For the reader's convenience, some acronyms are listed here:

| | |
|---|---|
| 4G | Fourth Generation wireless |
| 5G | Fifth Generation wireless |
| A-GPS | Assisted/Augmented GNSS |
| CPE | Consumer Premise Equipment |
| DTMF | Dual-Tone Multi Frequency |
| H-SLP | Home-SUPL Location Platform |
| IMS | IP Multimedia Subsystem |
| KPI | Key Performance Indicator |
| LCC | Local Connectivity Center |
| LTE | Long-Term Evolution |
| MANO | Management And Network Orchestration |
| MLP | Mobile Location Protocol |
| MME | Mobility Management Entity |
| NFV | Network Function Virtualization |
| NFVi | NFV Infrastructure |
| NID | Network Interface Device |
| NMP | Network Measurement Report |
| NTE | Network Telecommunications Equipment |
| OMA | Open Mobile Alliance |
| ONT | Optical Network Terminal |
| OTA | Over The Air |
| QoP | Quality of Position |
| RF | Radio Frequency |
| RXLEV | Received Signal Level |
| SBC | Session Border Controller |
| SET | SUPL Enabled Terminal |
| SGW | Serving Gateway |
| SIP | Session Initiation Protocol |
| SLIR | Standard Location Immediate Request |
| SLIA | Standard Location Immediate Answer |
| SUPL | Secure UserPlane Location |
| TA | Timing Advance |
| UE | User Equipment |
| USB | Universal Serial Bus |
| VoLTE | VOice over LTE |
| VPN | Virtual Private Network |
| VTA | Virtual Test Agent |
| VTP | Virtual Test Platform |

BACKGROUND

Telephone networks are becoming larger and increasingly complex. As former uninhabited areas are developed into towns and households, and as existing telephone networks in rural areas are increasingly upgraded to modern telephone infrastructure to support modern telephone capabilities, more segments of the transport infrastructure need to be tested.

Before the advent of the disclosed technology, testing a particular transport segment for audio quality required a technician to be physically proximate to the transport segment under test. Therefore, test technicians (aka "telephone linesmen") had to travel to the location served by an eNodeB and perform testing from there.

Traffic jams, severe inclement weather conditions, and pandemics compound the cost of human travel to the transport segment and may make travel inadvisable. Certain locations may be inaccessible in practice (e.g., a military or sensitive R&D facility which restricts access may require a linesman to have a security clearance. Security clearance applications may take months to process).

Also, it may be desirable to test other features of the telecommunication network, such as accuracy of location reporting (which may be useful for location-based services). These may necessitate different types of tests, which may require more time and effort by testers.

An opportunity arises to provide remote testing of segments, eliminating the need for travel. Further, an opportunity arises to perform multiple tests of the transport segment in the same session.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION OF THE INVENTION

The disclosed technology involves creating a media bridge between two calls—one call sent over the transport medium to be tested and another call sent to the tester. The media bridge is located in the core network, such as at a connectivity center.

The disclosed technology permits audio testing to occur in minutes. By comparison, the traditional approach of telephone companies (sending linemen to test audio of a segment, waiting for the linesman to reach the location served by the eNodeB/cell tower, and prepare the testing equipment) can take hours. The technology accomplishes this time reduction by eliminating the need for travel to the physical transport segment itself. Rather, testing occurs remotely from an operations center, or even from the comfort of a tester's home. By eliminating travel times, the technology can facilitate completion of ten audio tests in the time required for the linesman testing by the traditional travel-test process.

Briefly described, the technical system uses a bridge facilitator installed in a core network to initiate two separate direct calls to communication endpoints. The bridge facilitator then creates a media bridge between the two calls, and relays communications between the two calls. The bridge facilitator establishes a bi-directional audio path between the two communication endpoints.

This technology provides control over the origination of calls that cannot be achieved using network conference calling. Traditional conference calling gives the carrier's network and call routing apparatus control over routing of three or more users. It is naive to expect that the user who joins two outgoing calls into a conference call would be relaying communications during the conference. Instead, the network decides how to route the communications. Moreover, conference calling introduces points of failure that would complicate evaluation of test results. So, the technology disclosed uses two calls and a custom audio bridge, instead of a conference call.

The disclosure first provides a general environment, and then describes three use cases that align with the overall environment, using the example of audio testing. The disclosure then describes variations on tests and examples, and concludes with particular implementations of the technology.

Architecture

Figure 1:
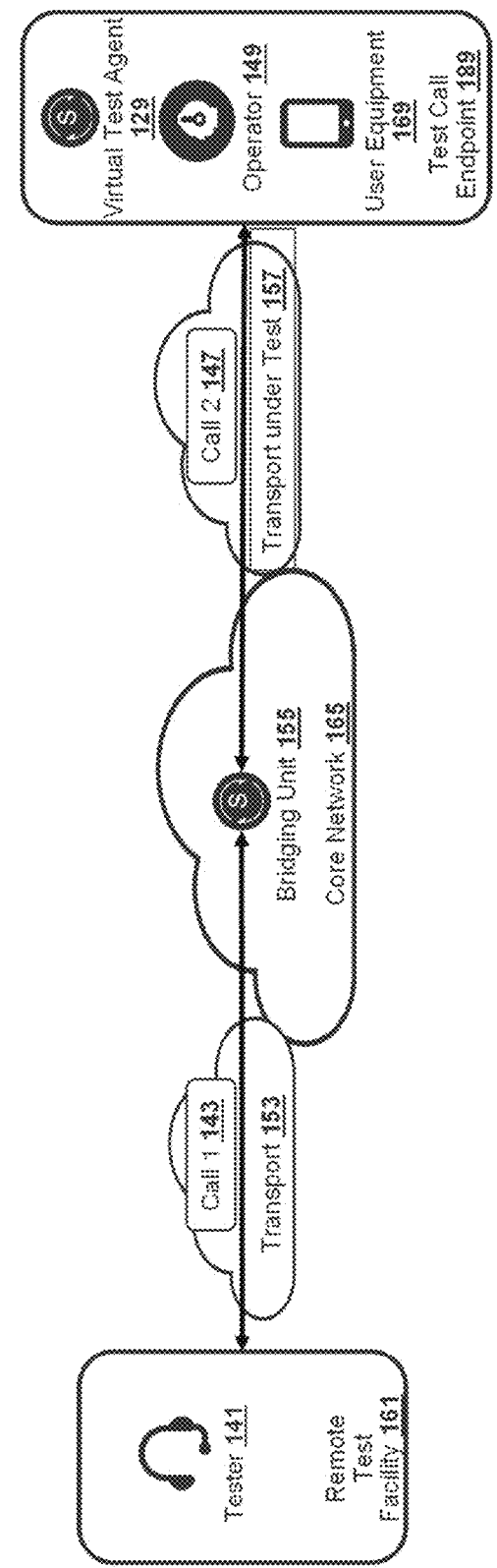
FIG. 1 illustrates an example architecture for testing voice quality from a location without being near that location.

FIG. 1 illustrates an example architecture for testing audio from a location without being near that location.

Telephone system 100 includes tester 141 at remote test facility 161, transport 153, bridging unit 155, core network 165, transport under test 157, call endpoint 189 including options of test VTA 129, operator 149, user equipment (UE) 169, call 1 143, call 2 147.

Tester 141 may be a person that uses telecommunication software to perform voice quality tests, by sending audio to and receiving audio from call endpoint 189. Alternatively, tester 141 may be a bot that uses telecommunication software, and that generates audio signals as well as receiving audio from an entity at test call endpoint 189. The received audio may be used to conduct audio quality tests, for example, by a person or as part of an E-model. E-model is described in ITU-T Rec. G.107, which is incorporated by reference herein.

Remote test facility 161 can be a call center, or can be any other facility, such as a corporate office, or personal residence. The term "facility" is used loosely here (e.g., a bench at a public park in service proximity with a cellular tower may be a facility), and the phrase may even encompass a general area that can receive call 1 143. Remote test facility 161 is located remotely from transport under test 157, and is served by transport 153.

Transport 153 may be any audio-bearing medium. When audio quality is being tested, transport 153 must also support audio of sufficient quality to avoid undue bias when evaluating the quality of call 2 147. To ensure audio quality tests provide usable results, "sufficient quality" of call 1 143 audio may be evaluated using Key Performance Indicators (KPI), and/or techniques available in information theory.

Bridging unit 155 is physically positioned on core network 165. Bridging unit may be hardware test platform such as Spirent E10, software such as a Virtual Test Platform (VTP) or Virtual Test Agent (VTA), or a combination of hardware and software. Bridging unit 155 may represent a standalone unit, or may represent one of plural units positioned at multiple locations in core network 165. Bridging unit 155 may record audio such as reference audio, transmitted audio and received audio, collect logs, post-process logs, as well as performing additional functions. Bridging unit 155 may support testing of Wi-Fi and IP Multimedia Subsystem (IMS) networks, including Over-The-Air (OTA) Long-Term Evolution (LTE) testing as well as mobile core testing. Bridging unit 155 is not limited to devices supporting specific wireless capabilities to connect to the cellular network, and instead represents the capability to connect and test independent of the particular radio technologies. Spirent Landslide is an example of a bridging unit. Two broad classes of Landslide are discussed below as examples.

Core network 165 includes infrastructure controlled by an Evolved Packet Core (EPC). A core network 165 services an area with numerous cellular towers, such as a state. The EPC interacts with User Equipment (UE) through one of several eNodeBs, at cellular towers. The eNodeBs interacts with the EPC through a Mobility Management Entity (MME) and Serving Gateway (SGW). A large cellular network will have multiple (e.g., 50+) EPCs, and multiple MMEs per EPC.

An MME is the control node for connection of cellular towers (eNodeBs) to a particular EPC in the cellular network. An eNodeB can be connected to multiple MMES, using a selection protocol. The MME is responsible for tracking and paging cell phones and other UE including retransmissions, and also for idle mode of User Equipment (UE). MME chooses the SGW for a UE during its initial attach.

A SGW complements the MME to complete call setup and carry call traffic to and from the UE.

Herein, core network 165 includes both elements of the telephone core network and elements that control the boundaries of the core network, such as edge routers, session border controllers, etc.). Thus, bridging unit may be positioned on boundary elements as well without falling outside of the contemplated disclosure.

Irrespective of its position within a core network 165, bridging unit 155 configures telephone system 100 to originate call 2 147 from an area served by the EPC, over transport under test 157 test to call endpoint 189.

Transport under test 157 is a transport segment that is in the routing path of call 2 147. The reasons for testing the transport under test 157 may vary. As some examples, the reason may be to determine if transport under test 157 is cause of complaints for poor audio quality, or may be that transport under test 157 has been newly installed and a telephone company wishes to verify that transport under test 157 can complete a call, or may be part of a telephone company's periodic maintenance.

Call endpoint 189 may be a communication endpoint of call 2 147 such as a designated test facility served by transport under test 157 or the location of a customer that is reporting audio quality issues.

Call endpoint 189 may have one or more of: test VTA 129, that may be configured to accept call 2 147 and evaluate Key Performance Indicators (KPIs); an operator 149 who accepts call 2 147 and reports subjective audio quality and/or other metadata about perceived audio quality; or UE 169 that is configured to automatically accept call 2 147 and automatically evaluate audio quality KPIs. UE 169 may be a smartphone, a mobile phone, a desktop telephone, a wall-mounted telephone, computer equipment (e.g., a desktop computer or laptop) with telephone software installed, or other implementations.

Testing for audio quality may involve the tester 141 transmitting voice and receiving transmissions of voice with call endpoint 189. Testing for audio quality may also be automated using approaches such as E-model (which predicts the perceived "mouth-to-ear" audio quality based on telephony-band impairment factors, and determines a scalar quality rating value called Transmission Rating Factor).

Testing may also involve reducing or simplifying other steps in call setup not provided here. For example, the test may ensure that the CODECS between tester 141 and call endpoint 189 are identical, removing the need for transcoding.

Example Bridging Unit: Landslide

Landslide is a scalable platform to test and emulate 5G and O-RAN mobile networks built on traditional or cloud-native infrastructure. It generates real-world control and data plane traffic of millions of mobile subscribers as they move through the network. Virtualized test functions may be deployed directly on cloud infrastructure to better assess cloud-native network function performance. This eliminates the need for carriers to perform expensive, non-repeatable, and time-consuming drive testing in the live network.

Landslide Virtual Test Agent

Figure 2:
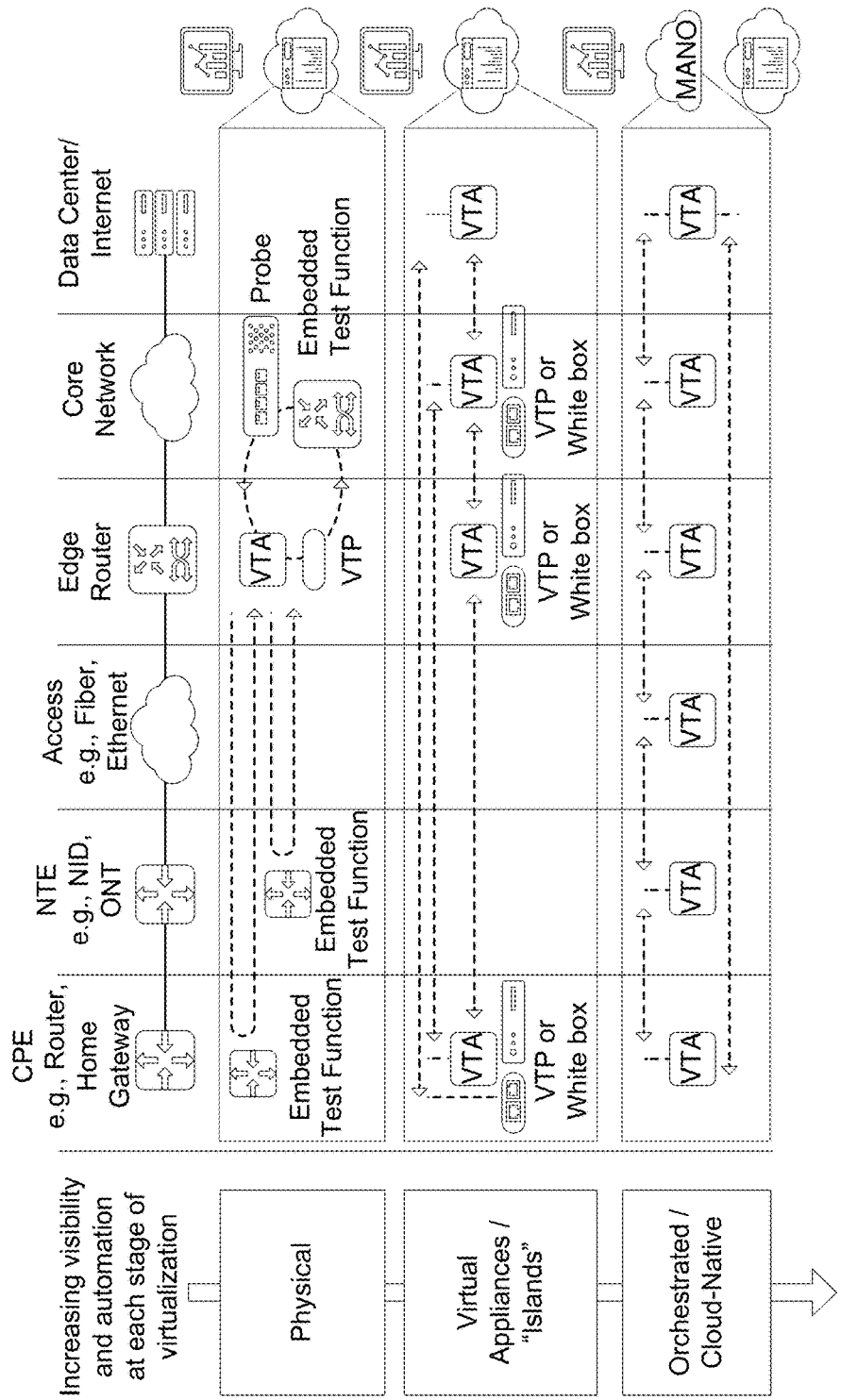
FIG. 2 illustrates potential Virtual Test Agent positions in a telephone system, depending on the level of Network Function Virtualization supported by the telephone network.

FIG. 2 illustrates potential Virtual Test Agent positions in a telephone system, depending on the level of Network Function Virtualization supported by the telephone network.

VisionWorks VTP Network Function Virtualization diagram 200 shows the various locations a VTA can be placed as the level of Network Function Virtualization (NFV) increases.

VisionWorks is a software test platform that supports quality testing across telephony networks, at varying levels of NFV. Amongst its test agents, VisionWorks provides VTAs. VisionWorks VTA is a catalog of microservices testing applications that are designed to perform tests with low computing resource costs and that can be deployed in multiple locations across the network. As the network's NFV stage increases towards total virtualization, more locations become available. Since VTAs are not physical testing components, they can be deployed while the tested system is online.

For networks at the physical stage, a VTA may be installed at an edge router. For networks at the virtualization stage, a VTA may be installed on customer premises equipment, an edge router, core network, or data center on the internet. For networks at either of the orchestration stage and cloud-native stage, a VTA may be installed on consumer protection equipment, network terminating equipment (such as network interface devices and optical network terminals), access (such as fiber and ethernet), edge router, core network, and the internet.

The position of the VTA does not affect its functionality. A VTA can control an EPCs even if not installed at that EPC. Thus, even large carrier with 50+EPCs can perform testing using VTAs installed at one or two EPCs.

Landslide Test Platform

When creating media bridges for testing, an alternative to VTAs is using a physical test platform.

For example, the Spirent Landslide E10 is a small form factor test platform that supports applications for benchtop, lab, and distributed testing of mobile and Wi-Fi networks. The E10 can be itself be used as a standalone system that is connected with the tele-communication network, or can be a test server in connection with other test platforms (e.g., the Spirent C100).

The E10 can support testing functions such as emulating users roaming and handing over throughout the mobile network, validating physical and virtual network functions for Mobile Core and IMS nodes, emulated adjacent network interfaces and nodes such that complete network topologies can be created on a desktop, Over the Air (OTA) testing over Mobile Radio Frequency (RF) network access devices using an OTA testing module (such as a U1 LTE module that can be installed on the E10) or real handsets, and other testing functionality. The E10 may have built-in tests or facilitate such tests. For example, the E10 can measure voice quality using Perceptual Objective Listening Quality Analysis (POLQA) Mean Opinion Score (MOS) in certain configurations, and can also facilitate E-model testing.

When real handsets are attached, the E10 uses cross-connection technology to create an audio bridge. The particulars of cross-connection technology are described in U.S. application Ser. No. 16/733,126, Systems and Methods for Using an Audio Cross-connect Cable for Remote Mobile Device Testing, filed on 2 Jan. 2020, now U.S. Pat. No. 10,841,413 issued on 17 Nov. 2020, which is incorporated by reference.

Three use-case examples of the technology applied to remotely audio testing of transport are provided below.

Use Case #1: Remotely Testing Transport Segment

Figure 3:
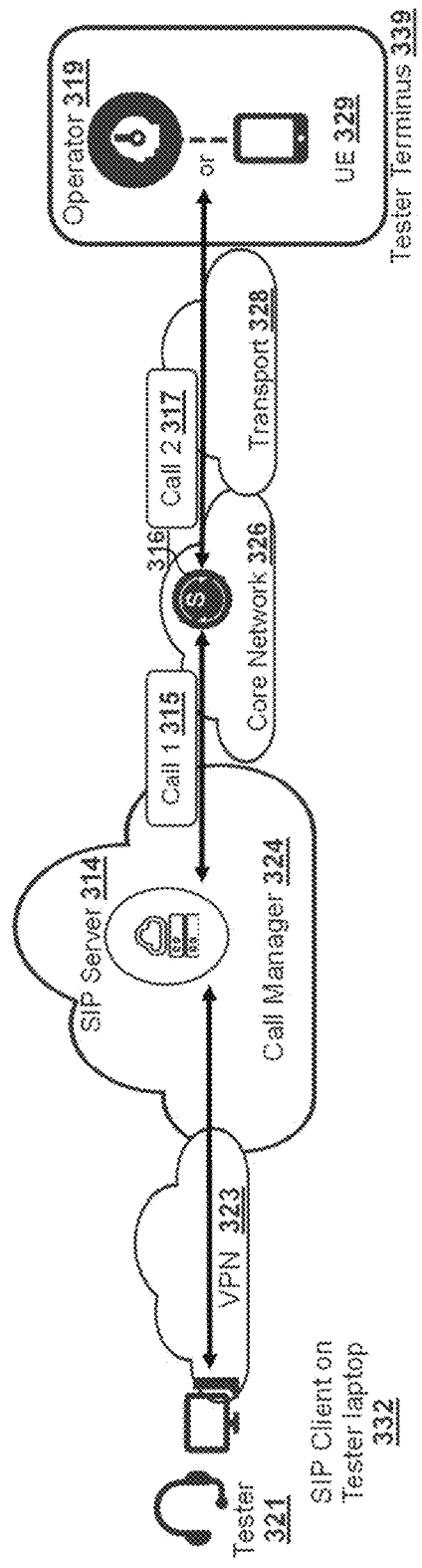
FIG. 3 illustrates a use case of remotely testing audio quality over a transport segment associated with a core network.

FIG. 3 illustrates a use case of remotely testing audio quality over a transport segment associated with a core network.

Telephone system 300 includes tester 321 named Tony, tester appliance 332, Virtual Private Network (VPN) 323, Session Initiation Protocol (SIP) server 314, call manager 324, core network 326, Virtual Test Agent (VTA) 316, transport segment under test 328, operator 319, User Equipment (UE) 329, tester terminus 339, call 1 315, and call 2 317.

For example, consider tester Tony, who is at a laptop with a tester appliance located in Texas. Tony leverages a VTA that can connect to MME's across the country to approximate point-to-point customer connections. A customer who is experiencing an audio quality problem is in New York. The customer had audio quality problems while calling a friend in Pennsylvania. The carrier operates a pair of core networks cover New York and Pennsylvania, using a pair of EPCs. The EPCs each are connected to multiple eNodeBs.

Tony would like to test the audio quality for calls between New York and Pennsylvania, even though he is in Texas and cannot travel to the East coast. Tony operates his test appliance two make two separate calls. The tester's test appliance uses a network connection to connect with a VTA in Texas, on the tester's own EPS (though the technology is not so limited—the VTA could be located anywhere in the core network) to connect a first call through an MME in Pennsylvania to himself, and a second call to the customer in NY who has called in their complaint. The connection using the MME in PA to the customer in NY approximates the call routing about which the customer called to complain.

Telephone system 300 is a system with transport segment under test 328 that requires audio quality testing.

In general, tester 321 and tester appliance 332 may be within a local area network (such as ethernet network serving a call center or corporate office) and connects to core network 326, by Session Initiation protocol (SIP) server 314 managed by call manager 323, through VPN 122. Tester 321 may be a person. Tester appliance 332 may be hardware (e.g., a telephone) or software (e.g., a SIP client executing on a computer). In some implementations, tester appliance 332 may be configured to relay audio from tester 321 or alternatively may be configured to both relay audio from tester 321 and generate audio usable to test audio quality. In further implementations, generated audio may be prerecorded audio and/or may be generated by a computer program. In our example, tester Tony and the test appliance he is using are in Texas.

Tester 321 and tester appliance 332 are typically remote from transport segment under test 328. Tester 321 and tester appliance 332 could be physically separated from transport segment 328 past touching distance, by at least 1 mile part, 10 miles, 30 miles, 50 miles, or even physically located in entirely different administrative districts (e.g., different United States counties) that are served by a core network. In our example, a Tony in Texas is servicing a complaint from the East Coast, regarding a connection between New York and Pennsylvania.

Generally, VTA 316 may be provisioned in core network 326 as an eNodeB, and originates calls from core network 326 by emulating a subscriber making a call from the eNodeB. VTA 316 is capable of emulating one or more UE on any sector of any cell tower through any core. The emulated UE may initiate calls, including call 1 315 and call 2 317.

VTA 316 controls call origination by sending signaling traffic to the MME of core network 326. Once the call is established, the data is sent to an SGW. In this way, it is unnecessary for the signaling traffic initiating the test to be sent through an eNodeB. A network connection to VTA 316 is sufficient to deliver the signaling traffic to the MME and initiate the call.

Tester terminus 339 is a communication endpoint for a test call. Tester terminus 339 may be a call center, a private domicile, or other building containing operator 319, that may be communicatively reached by audio routed over transport segment under test 328. Tester Terminus 339 may also facilitate the customer reporting the problem. Tester terminus 339 may instead be, or contain, User Equipment 329 that automatically or semi-automatically respond to a testing request.

The test process may be initiated when VTA 316 receives a signal to test transport segment under test 328. VTA 316 selects tester 321 to perform the test. The signal may be of any form and from any source (e.g., an out of band signal from tester 321 requesting test initiation, test allocation by a transport segment test dispatcher (not shown) to an available tester 321, a computer program that interfaces with VTA 316 that randomly assigns tester 321, etc.)

Use Case #1 Call Flow

Figure 4:
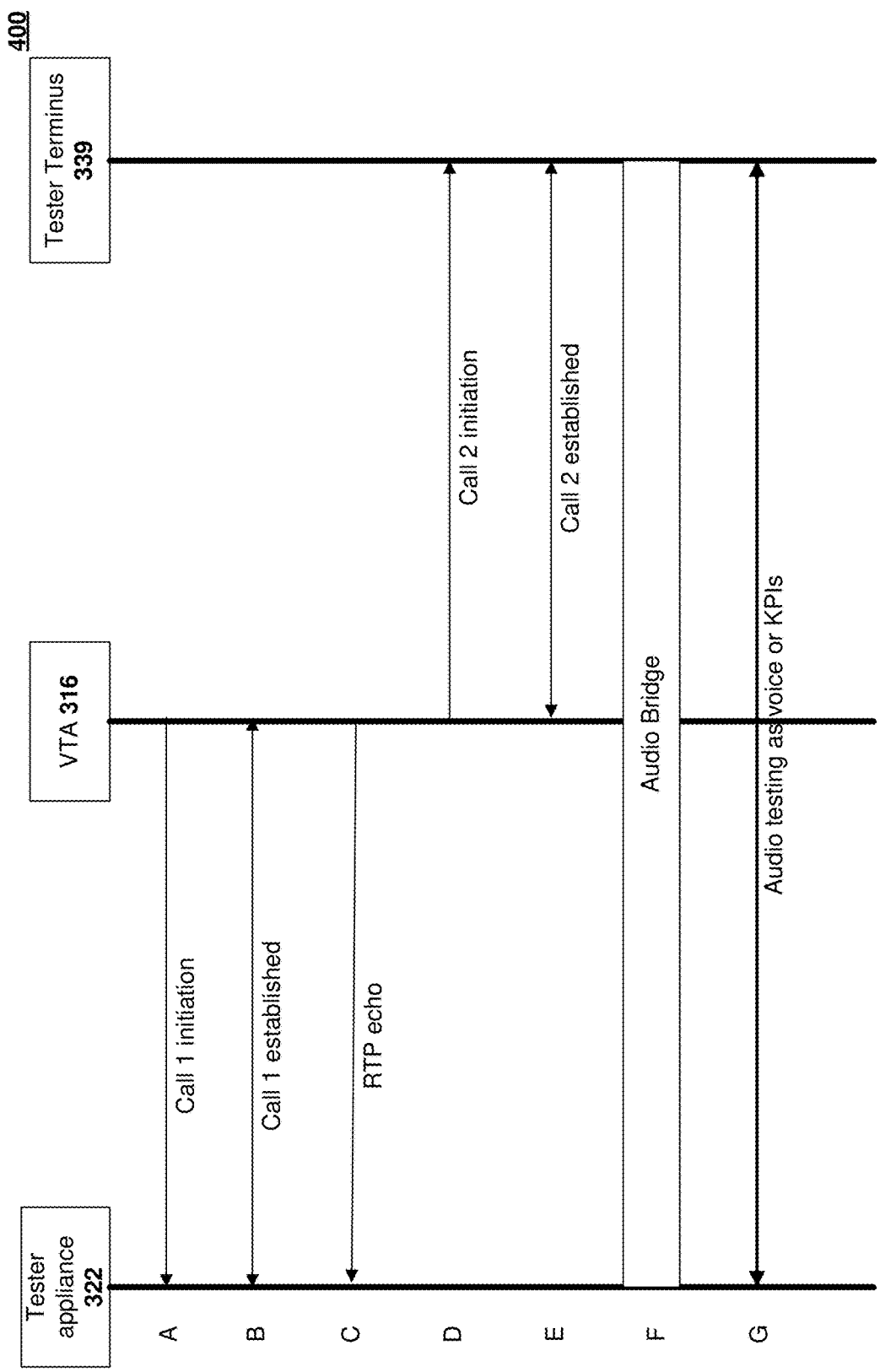
FIG. 4 illustrates a message flow diagram of the audio quality test

FIG. 4 illustrates a message flow diagram for an audio quality test of a transport segment associated with a core network.

Message flow diagram 400 shows how tester appliance 322, VTA 316, and tester terminus 339 communicate during the audio quality test to tester terminus 339. In our hypothetical example, tester appliance 322 is with the service representative in Texas and the tester terminus is the customer being serviced in New York.

At step A, VTA 316 makes a direct call 1 315 to tester appliance 332, and waits for call 1 315 to be established.

At step B, VTA 316 confirms that call 1 315 has been established.

At step C, VTA 316 sends an RTP echo to tester appliance 332. This step avoids the network dropping call 1 315 while setting up call 2 317.

At step D, once call 1 315 to tester appliance 332 has been established, VTA 316 makes direct call 2 317 to transport terminus 339. VTA 316 routes call 2 317 over transport segment under test 328.

At step E, VTA 316 confirms that call 2 317 has been established.

At step F, once the second call to testing terminus 339 is established, VTA 316 bridges the first and second calls, thus configuring the system to relay audio between the two calls.

At step G, once the audio bridge is established, audio quality of transport segment under test 328 is tested by relaying audio between tester appliance 332 and testing terminus 339 via the audio bridge. Audio testing may involve, for example, tester 321 exchanging verbal communication with operator 319, and tester 321 may report subjective impressions of audio quality or cause measurement of audio quality KPIs.

Use Case #2: Remote Testing Transport Between Core Networks

Figure 5:
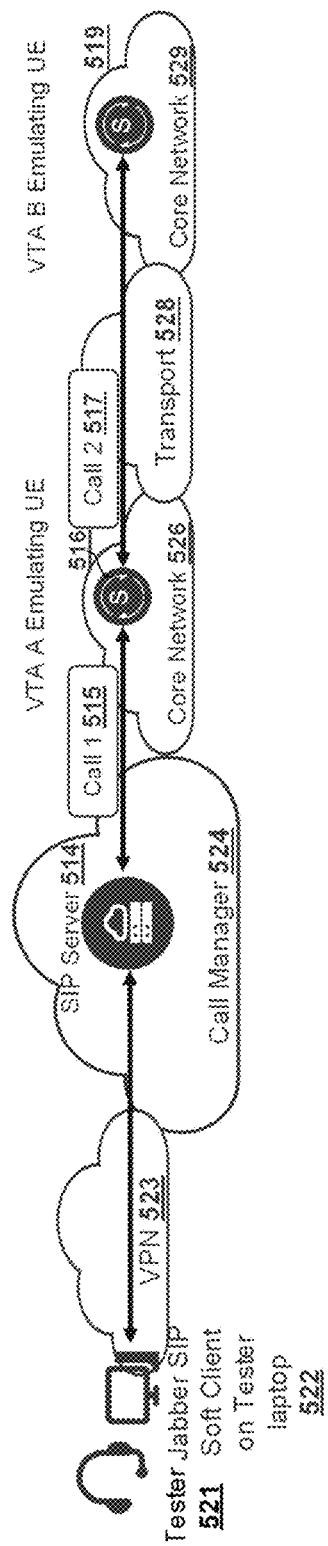
FIG. 5 illustrates a use case of remotely testing audio quality of a transport segment between two core networks.

FIG. 5 illustrates a use case of remotely testing audio quality of a transport segment between two core networks.

Telephone system 500 includes tester 521, tester appliance 522, VPN 523, SIP server 514, call manager 524, transport segment 528 being tested, call 1 515, call 2 517, VTA A 516, VTA B 519, core network A 526, and core network B 529.

For example, consider that tester Tony and his laptop, who is still located in Texas, and the New York customer's friend is still in Pennsylvania. In this scenario, the customer and friend are served by two different core networks. Here, the test is to determine whether the transport between the core networks has negatively impacted the audio sent between the two core networks.

Again, Tony would like to test the audio quality for calls between New York and Pennsylvania, even though he is in Texas and cannot travel to the East coast. Tony operates his tester appliance to make two calls, by signaling an MME in Pennsylvania. The first call is to himself, in TX, and the second is to the customer in NY who has called in their complaint. The connection through the MME in PA to the customer in NY approximates the call routing about which the customer called to complain.

Telephone system 500 is the system with transport segment 528 being tested. Transport segment 528 undergoing test may be between core network A 526 and core network B 529.

In this example, tester 521 has the task of testing the audio quality of transport segment 528 that sits between core network A 526 and core network B 529. Tester 521 and tester appliance 522 may be within a local area network (such as ethernet network serving a call center or corporate office) and connects to core network 526 by SIP server 514 and managed by call manager 524 through VPN 122. Tester appliance 522 may be hardware (e.g., a telephone) or a combination of hardware and software (e.g., a SIP client executing on a computer).

Tester 521 and tester appliance 522 may be remote from transport segment 528. For example, tester 521 and tester appliance 522 could be physically separated from transport segment 528 that exceeds touching distance, at least 1 mile part, 10 miles, 30 miles, 50 miles, or even physically located in entirely different administrative districts (e.g., different United States counties) that are served by core networks A 526 and B 529.

Generally, VTA A 516 may be provisioned in core network A 526 as an eNodeB, and originates calls from core network A 526 by emulating a subscriber making a call from the eNodeB. VTA A 516 may be capable of emulating UE in any Local Connectivity Center (LCC), such as New York, without the physical presence of tester 521. An LCC is a physical location with people and equipment. The emulated UE may initiate calls, including call 1 515 and call 2 517. In some implementations, the emulated UE is emulating more than one UE. In such implementations, call 1 515 and call 2 517 are made from separate emulated UE. In other implementations, the emulated UE making call 1 515 and call 2 517 is a single emulated phone. VTA 516 controls call origination by sending signaling traffic to the MME of core network 326. Once the call is established, the data is sent to an SGW. In this way, it is unnecessary for the signaling traffic initiating the test to be sent through an eNodeB. A network connection to VTA 316 is sufficient to deliver the signaling traffic to the MME and initiate the call.

VTA B 519 may be installed on core network B 529, and serves as a communication endpoint for call 2 517. VTA B 519 may emulate UE in an LCC other than the first LCC, such as in Pennsylvania. VTA B 519 may be configured to record and report audio quality metrics, responsive to being contacted as part of an audio quality test. VTA B 519 may alternatively be installed at the customer reporting the problem.

The test process may be initiated when VTA A 516 receives a signal to test transport segment 528, which is between the example of Pennsylvania and New York. VTA A 516 selects tester 521 to perform the test. The signal may be of any form and from any source (e.g., an out of band signal from tester 521 requesting test initiation, test allocation by a transport segment test dispatcher (not shown) to an available tester 521, a computer program that interfaces with VTA A 516 that randomly assigns tester 521, etc.) Tester 521, operating test appliance 522, evaluates the call.

Use Case #2 Call Flow

Figure 6:
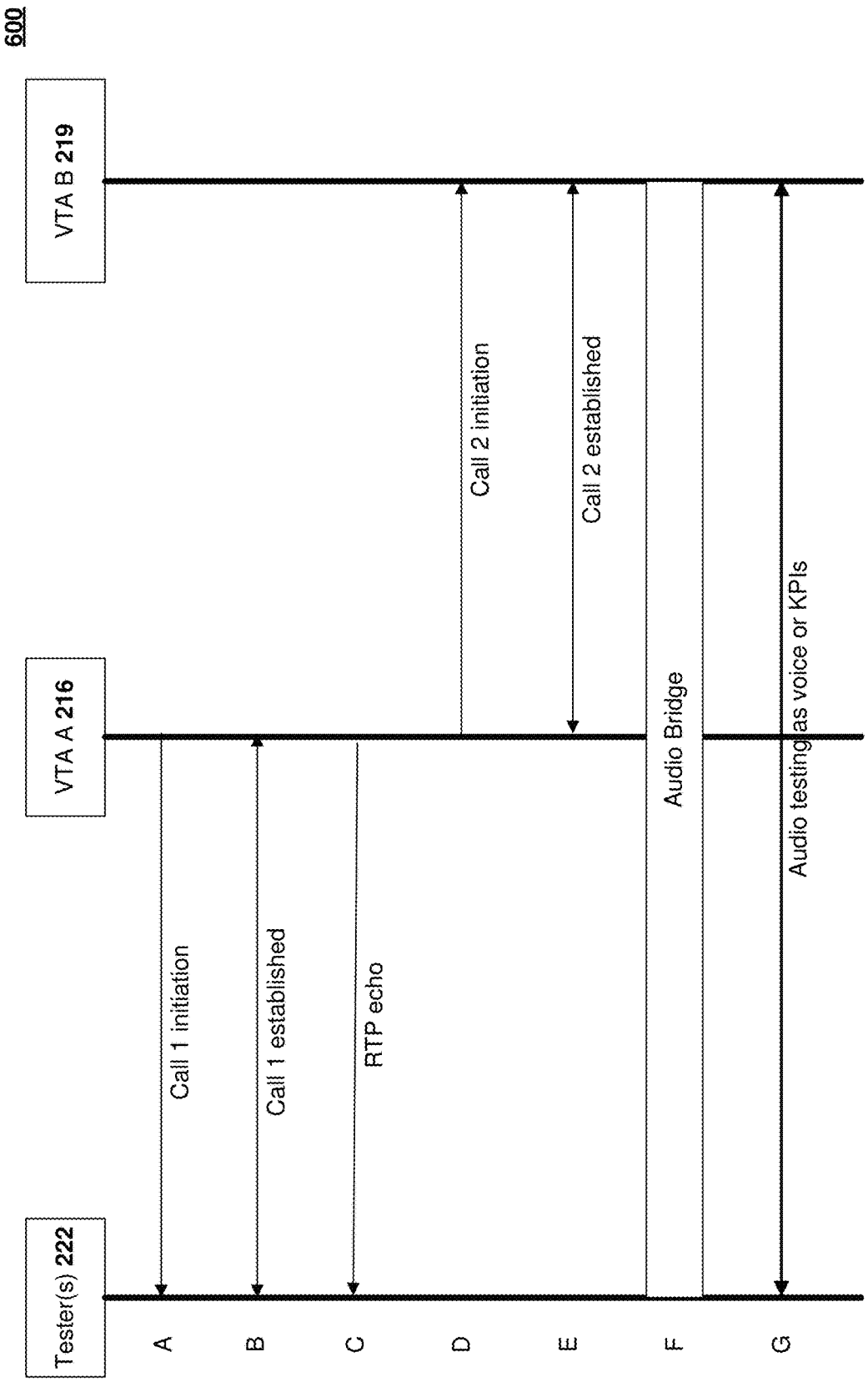
FIG. 6 illustrates a message flow diagram of the audio quality test between two core networks.

FIG. 6 illustrates a message flow diagram of the audio quality test between two core networks.

Message flow diagram 600 shows how tester appliance 522, VTA A 516, and VTA B 519 communicate during the audio quality test between two core networks.

At step A, VTA A 516 makes a first direct call 515 to tester appliance 522, and waits for first call 515 to be established.

At step B, tester appliance 522 confirms establishment of first call 515.

At step C, sends an RTP echo to tester appliance 332. This step avoids the network dropping call 1 315 while setting up call 2 317.

At step D, once first call 515 to tester appliance 522 has been established, VTA A 516 makes direct call 2 517 to VTA B 519. VTA A 516 makes call 2 517 routed over transport segment 528.

At step E, VTA A 516 confirms that call 2 517 has been established to VTA B 519.

At step F, once call 2 519 to VTA B 519 is established, VTA A 516 bridges both call 1 515 and call 2 517, thus configuring the system to relay audio between the two calls.

At step G, once the audio bridge the calls is established, audio quality is tested by relaying audio between tester appliance 522 and VTA B 529 via the audio bridge. In some implementations, VTA B 529 may contain a prerecorded message for tester 521, at tester appliance 522, to perform subjective or objective (such as by KPI) evaluation of audio quality. In some implementations, VTA B 529 may also record KPIs based on audio relayed from tester appliance 522, and report the KPIs to tester appliance 522.

Use Case #3: Remote Testing of Over the Air

Figure 7:
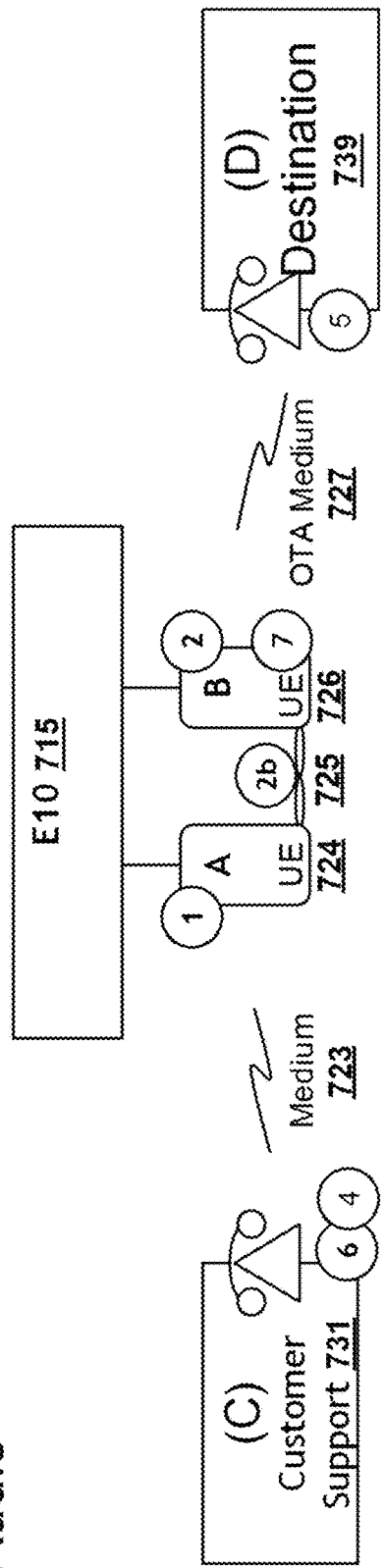
FIG. 7 illustrates a use case of remotely testing call delivery Over the Air.

FIG. 7 illustrates a use case of remotely testing call delivery Over the Air.

Telephone system 700 includes test platform 715, User Equipment (UE) "A" 724, UE "B" 726 connected by audio cross-connect 725, Customer Support "C" 731, Destination "D" 739, audio medium 723, and OTA medium 727. Customer support C 731 is also referred to as tester.

The test itself determines if a call can be delivered OTA from UE B 726 to D 739.

Test platform 715 is configured with bridging logic that is suitable to test a telephone connection made Over the Air (OTA), and is located at a core network that serves destination 739. Test platform 715 is connected to UE A 724 and UE B 726 by Universal Serial Bus (USB) connections. As an alternative or addition to a USB connection, test platform 715 may be configured with a Bluetooth™ component, such as a built-in component or a USB adapter, that connects with UE A 724 and UE B 726. In this particular example, test platform 715 is a Spirent Landslide™ E10 Small Form Factor, Mobile Core, Wi-Fi, Diameter, and IMS Test System, and is configured to perform OTA testing. Particular features of the E10 can be found in the Spirent Landslide™ E10 datasheet, which is incorporated by reference in its entirety. Test platform 715 is not limited to Landslide. Other test platforms capable of OTA testing may also be used as test platform 715 or may be configured to be used as test platform 715. Examples of those other test platforms include those by Keysight, Rohde & Schwarz, etc.

UE A 724 and UE B 726 may be cellular handsets that are linked by audio cross-connect 725, enabling transmission of audio between UE A 724 and UE B 726. In some implementations, the UE may be laptops, handheld transceivers, or other portable electronic communications devices that are capable of interfacing with the test platform 715.

Customer support C 731 may be a person that tests whether calls can be delivered OTA to Destination D 739. C 731 may be physically located remotely from test platform 715 and Destination D 739. Remote location could be outside of physical touching distance, a distance of a mile, a distance of 10 miles, a distance 50 miles, or even having locations within different administrative districts. The location of C 731 is not limited, other than being remote from test platform 715.

Destination D 739 is a telephone being used to test whether audio sent OTA reaches the location of D 739. In some implementations, D 739 may be operated by customers that are reporting low audio quality to a telephone system company. In other implementations, D 739 may be operated by one or more testing professionals whose responsibilities encompass testing local audio.

In some implementations, audio medium 723 may be air or include air. In other implementations, audio medium 723 may be any other transport medium used to transmit telephone signals. In any variation of this use case, OTA medium 727 is the link under test. OTA medium 727 includes air.

Test platform 715 initiates the audio test using bridging logic. The bridging logic of test platform 715 calls customer support C 731 from UE A 724 via audio medium 723.

For the test to be successful, C 731 must hear and know that the call completed. Neither KPIs measurement nor DTMF is necessary.

Use Case #3 Call Flow

Figure 8:
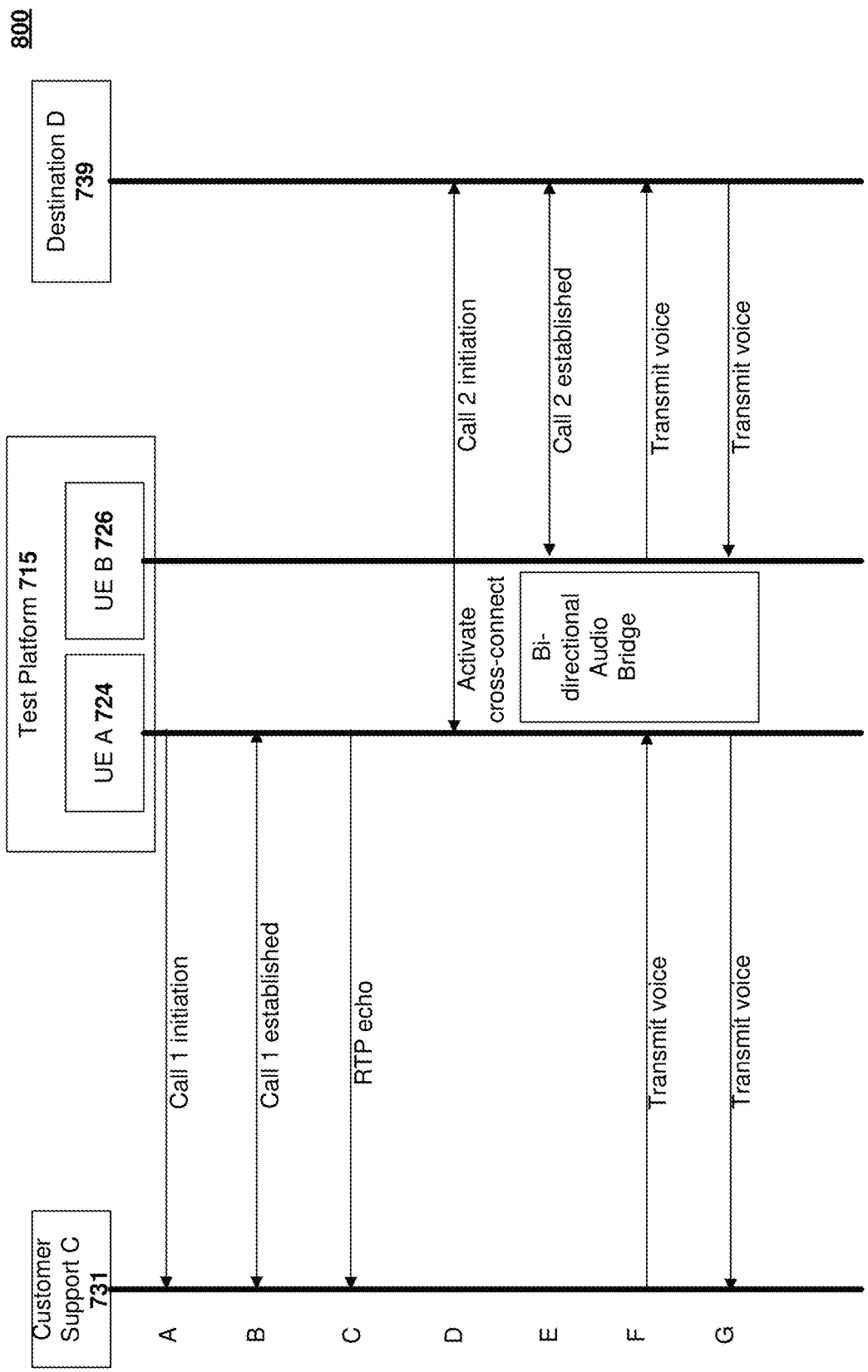
FIG. 8 illustrates a message flow diagram of the call delivery test.

FIG. 8 illustrates a message flow diagram of the call delivery OTA test.

Message flow diagram 800 shows how UE A 724, UE B 726, Customer Support C 731, and Destination D 739 communicate during the call delivery test.

At step A, a first call between UE A 724 and C 731 is initiated, over audio medium 723

At step B, the first call between UE A 724 and C 731 is established.

At step C, two actions occur by UE B 726 at the same time. The first action is that a second call between 726 and D 739 is initiated over OTA medium 727. The second action is that audio cross-connect 725 is activated, this establishing a bi-directional audio bridge between UE A 724 and UE B 726. This permits A 724 to receive the audio from the second call setup between UE B 726 and D 739 being established.

For purposes of this example, "at the same time" for step C may be within the span of 1 second. In general, part of the test is for UE A 724 to receive the audio from the call setup between UE B 726 and D 739. Typical call setup time for VoLTE, as of 2023, may be between 3-5 seconds. It is contemplated that as future technological advances reduce average call setup time, the threshold for "at the same time" may also be commensurately reduced such that UE A 724 can hear the call setup between UE B 726 and D 739.

Once both calls over audio medium 723 and OTA medium 727 are established, audio may be relayed between C 731 and D 739 via audio cross-connect 725 between UE A 724 and UE B and 726.

At step D, the second call is established. C 731 can hear that the second call was established via the bi-directional audio bridge.

At step E, C 731 speaks and the spoken audio is relayed via medium 723 to A 724. B 726 receives the audio through audio cross-connect 725 with A 724. B 726 then relays the audio OTA to D 739.

At step F, D 739 speaks a response. The response audio is sent OTA through OTA medium 727 to B 726, through audio cross-connect 725 to A 724, and then through audio medium 723 to C 731.

At this point, the test is complete. Again, no measurement of KPIs is necessary for this particular test. It would be also an easy variation to also test audio quality, such as presented in the first two examples.

The three uses cases above are examples of how the technology enables remotely testing transport. Each possible permutations and variations of the features amongst the examples that also enable remotely testing transport may not be expressly set forth in its own example, but would be understood by those of ordinary skill in the art, and are thus disclosed.

Variations on Use Cases

Common potential modifications to the use cases may involve measures to ensure the accuracy of the test. For example, when testing for audio quality, first call (whether call 1 315, call 1 515, or the first call over audio medium 723) may itself be evaluated for sufficient audio quality to avoid undue bias in determining the audio quality of the second call. Each use case may involve the bridging unit (whether the bridging unit is a VTA, a testing platform, or other such unit) sampling the first call to produce KPIs.

Although the use cases, as described above, focus on audio quality testing, the technology is not limited to such. Any media capable of being exchanged through Real Time Protocol (RTP) may be bridged. For example, instead of an audio bridge, the technology could be extended to transmitted video. The technology also supports testing of other call properties, such as latency.

Another advantage of the technology is that other tests can be conducted simultaneously with the quality test.

Earlier-filed application E911 Backhaul Routing Tests Remote From Coverage Area, U.S. Ser. No. 17/858,013 (SPIR 1167-1), which revolved around E911 infrastructure and is the parent of this disclosure, involved testing location-based routing to particular public-safety answering points without having to send a mobile device operator to the actual physical location.

Testing location-based routing may also be useful for non-emergency service contexts. For example, modern-day location-based services may rely on location information being transmitted during a call session from a mobile device for the customer's convenience when providing local customer service. As another example, such services may provide local purchasing-delivery opportunities that may be of interest while the customer is traveling through the local area. Thus, testing the correctness of location-based routing and accuracy of reported location may be of interest in non-E911 contexts.

Verifying correct routing may also be used as a sanity check during call quality tests, as described above, to ensure the correct transport is being tested. Using use case #2 as an example, if the test of call quality that is ostensibly between the city of Miami and the city of New York reports crystal clear quality, but the connectivity center hosting VTA 519 serves Kansas, this may indicate further underlying problems.

A variation of the disclosed technology, as deployed through non-E911 infrastructure, may facilitate tests of location-based routing.

Secure UserPlane Location

Figure 9:
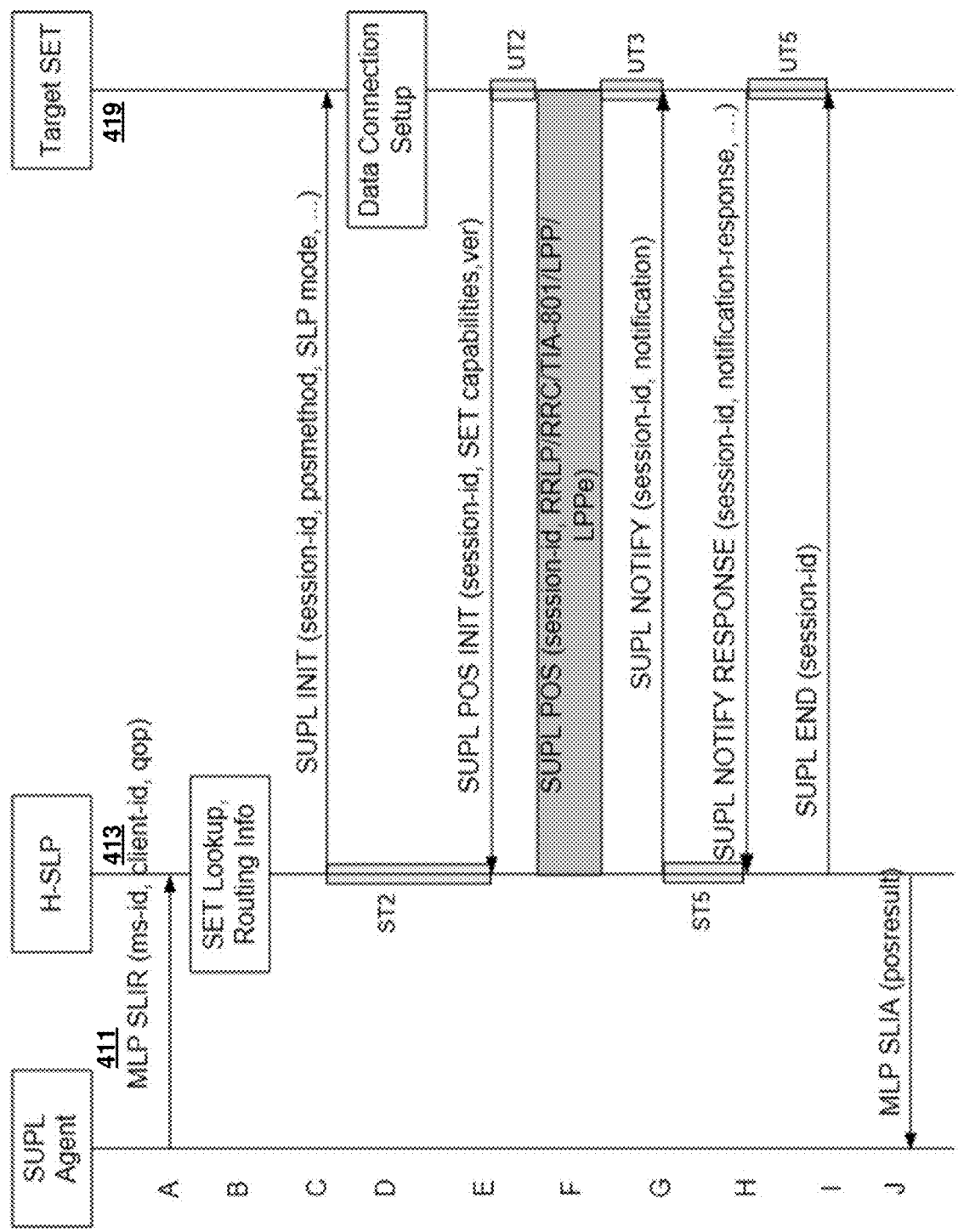
FIG. 9. Illustrates a timing diagram that explains the steps of providing positioning information via Secure UserPlane Location.

FIG. 9 illustrates a timing diagram that explains the steps of providing positioning information via Secure UserPlane Location. The positioning information can be sent to, and verified by, call endpoint 189.

Timing diagram 900 illustrates how location information is obtained and provided to call endpoint 189. This is an edited description from Open Mobile Alliance (OMA), UserPlane Location Protocol v2.0.5 p88-89. The entirety of the UserPlane Location Protocol specification is incorporated by reference. Edits to the description include, without any intended change to meaning, padding capital letter message names with quotes to permit the reader to distinguish over the use of capital letter abbreviations and correction of minor typographical errors.

At step A, the Secure UserPlane Location (SUPL) Agent issues a Mobile Location Protocol (MLP) "SLIR" message to the Home-SUPL Location Platform (H-SLP), with which SUPL Agent is associated. The H-SLP authenticates the SUPL Agent and checks if the SUPL Agent is authorized for the service it requests, based on the client-id received. Further, based on the received ms-id the H-SLP applies subscriber privacy against the client-id.

If a previously computed position which meets the requested Quality of Position (QoP) is available at the H-SLP and, based on that position, no notification or verification is required, the H-SLP directly proceeds to step J. If, based on that position, notification and verification or notification only is required, the H-SLP proceeds to step B.

At step B, The SLP verifies that the target terminal is currently within the service area of the SLP, i.e., the target terminal is not roaming. The SLP may also verify that the target terminal supports SUPL.

At step C, The H-SLP initiates the location session with the SET using the SUPL "INIT" message. The SUPL "INIT" message contains at least session-id, proxy/non-proxy mode indicator and the intended positioning method. As in this case the result of the privacy check in Step A indicates that subscriber privacy check based on current location is required, the H-SLP includes the Notification Mode element in the SUPL "INIT" message to indicate notification based on current location and does not include the notification element in the SUPL "INIT" message.

Before the SUPL "INIT" message is sent the H-SLP also computes and stores a hash of the message.

If in step A the H-SLP decided to use a previously computed position, the SUPL "INIT" message indicates this in a 'no position' posmethod parameter value and the SUPL Enabled Terminal (SET) responds with a SUPL "END" message carrying the results of the verification process (access granted, or access denied). If no explicit verification is required (notification only) the SET responds with a SUPL "END" message. The H-SLP then directly proceeds to step J.

At step D, the SET analyzes the received SUPL "INIT." If found to be non-authentic, the SET takes no further actions. Otherwise, the SET takes needed action preparing for establishment or resumption of a secure connection.

At step E, the SET will evaluate the Notification rules and follow the appropriate actions. The SET checks the notification mode indicator and determines that in this case the notification is performed based on the location of the SET. The SET also checks the proxy/non-proxy mode indicator to determine if the H-SLP uses proxy or non-proxy mode. In this case, proxy mode is used, and the SET establishes a secure connection to the H-SLP using H-SLP address that has been provisioned by the Home Network to the SET. The SET then sends a SUPL "POS INIT" message to start a positioning session with the H-SLP. The SUPL "POS INIT" message contains at least session-id, SET capabilities, a hash of the received SUPL "INIT" message (ver) and Location ID (lid). The SET capabilities include the supported positioning methods (e.g., SET-Assisted Assisted-GNSS (A-GPS), SET-Based A-GPS) and associated positioning protocols (e.g., RRLP, RRC, TIA-801 or LPP/LPPe). The SET may provide a Network Measurement Report (NMR) specific for the radio technology being used (e.g., for GSM: Timing Advance(TA), Received Signal Level (RXLEV)). The SET may provide its position, if these are available and supported by both SET and H-SLP. The SET MAY set the Requested Assistance Data element in the SUPL "POS INIT".

If a position received from or calculated based on information received in the SUPL "POS INIT" message is available that meets the required QoP, the H-SLP may directly proceed to step G and not engage in a SUPL POS session.

At step F, checks that the hash of SUPL "INIT" matches the one it has computed for this particular session. Based on the SUPL "POS INIT" message including posmethod(s) supported by the SET the H-SLP then determines the posmethod. If required for the posmethod the H-SLP uses the supported positioning protocol (e.g., RRLP, RRC, TIA-801 or LPP/LPPe) from the SUPL "POS INIT" message.

The SET and the H-SLP exchange several successive positioning procedure messages.

The H-SLP calculates the position estimate based on the received positioning measurements (SET-Assisted) or the SET calculates the position estimate based on assistance obtained from the H-SLP (SET-Based).

At step G, the H-SLP applies subscriber privacy against the SET position estimate determined in Step F. If, based on this position, notification and verification or notification only is required, the H-SLP sends a SUPL "NOTIFY" message to the SET. The SUPL "NOTIFY" message contains the notification element. If, based on this position, no notification and verification is required, the H-SLP directly proceeds to Step I.

At step H, the SET sends a SUPL "NOTIFY RESPONSE" message to the H-SLP. If notification and verification was required in step G then this will contain the notification response from the user.

At step I, once the position calculation is complete the H-SLP sends the SUPL "END" message to the SET informing it that no further positioning procedure will be started and that the location session is finished. The SET releases the secure connection to the H-SLP and release all resources related to this session.

At step J, the H-SLP sends the position estimate back to the SUPL Agent in an MLP "SLIA" message and the H-SLP releases all resources related to the session.

The following table provides the timing requirements shown in timing diagram 400. UT refers to SET timers, and "ST" refers to SLP timers.

| Timer | Default value | Description | Expiration |
|---|---|---|---|
| UT2 | 11 seconds | From sending of SUPL POS INIT to receipt of first SUPL POS, SUPL REPORT or SUPL END message. UT2 is not needed if the SUPL POS INIT message contains the first SUPL POS element. | For immediate applications the SET sends SUPL END to the SLP and clears all session resources. For triggered applications, the SET skips the SUPL POS session and continues the triggered session. |
| UT3 | 10 seconds | From sending of the last SUPL POS message to receipt of SUPL END, SUPL REPORT or SUPL NOTIFY. In cases where there is no SUPL POS message sent from SET, timer UT3 is not used. | For immediate applications, the SET sends SUPL END to the SLP and clears all session resources. For triggered applications, the SET continues the triggered session. |
| UT5 | 10 seconds | Only applicable to "notification based on location" scenarios. From sending of SUPL NOTIFY RESPONSE to receipt of SUPL END | The SET sends SUPL END to the SLP. The SET clears all session resources. |
| ST2 | 10 seconds for proxy, 50+ optionally response time in QoP | For proxy mode: from sending of SUPL INIT to receipt of SUPL POS INIT, SUPL TRIGGERED START or SUPL END. For non-proxy mode: from sending SUPL INIT to (a) receipt of notification (internal communication between SPC and SLC) that SUPL POS INIT has been received, (b) receipt of RLP-SSRP(SUPL END) from V-SLP, (c) receipt of SUPL TRIGGERED START, (d) receipt of SUPL REPORT or (e) receipt of SUPL END. | For non-roaming scenario: Inform SUPL agent that the session has ended. For roaming scenario: Inform SUPL agent or, where applicable, R-SLP that the session has ended. For proxy: Clear session resources at SLP For non-proxy: Clear session resources at SLC and send internal communication to SPC to clear session resources at SPC where applicable. |
| ST5 | 10 seconds | From sending SUPL NOTIFY to receipt of SUPL NOTIFY RESPONSE. | Send SUPL END to SET. Clear session resources at SLP. |

The SET and the H-SLP may exchange several successive positioning procedure messages.

The applications of location-based routing of phone numbers should be apparent to those skilled in the art. As a fictitious example of one such application, recall that in recent history, alcohol consumption laws were relaxed in many states to permit public outdoor drinking in a health-safe environment. Assume a nationwide chain of drinking establishments partners with local delivery services in states where light outdoor drinking is permitted. When a potential customer on a casual walk is thirsty for an adult beverage, the customer can call 1-800-SND-BEER (Again, this is a fictitious example. This is not a real phone number.) If the customer is in an area where outdoor drinking is legal, the call and the user's location will be routed to the nearest establishment with an available beer delivery-person to complete the order. If the customer is not in such an area, the customer may be directed to the closest area for delivery (or the closest bar). The ability to test location-based routing ensures that businesses opportunities can be captured without the risk of costing the participating businesses their liquor licenses.

Other commercial uses of location-based testing (e.g., facilitating accuracy of location-based advertising) may be extrapolated by the example.

Other types of testing, and their uses to test telephone network issues, can be extrapolated from the use cases and variations.

Computer System

Figure 10:
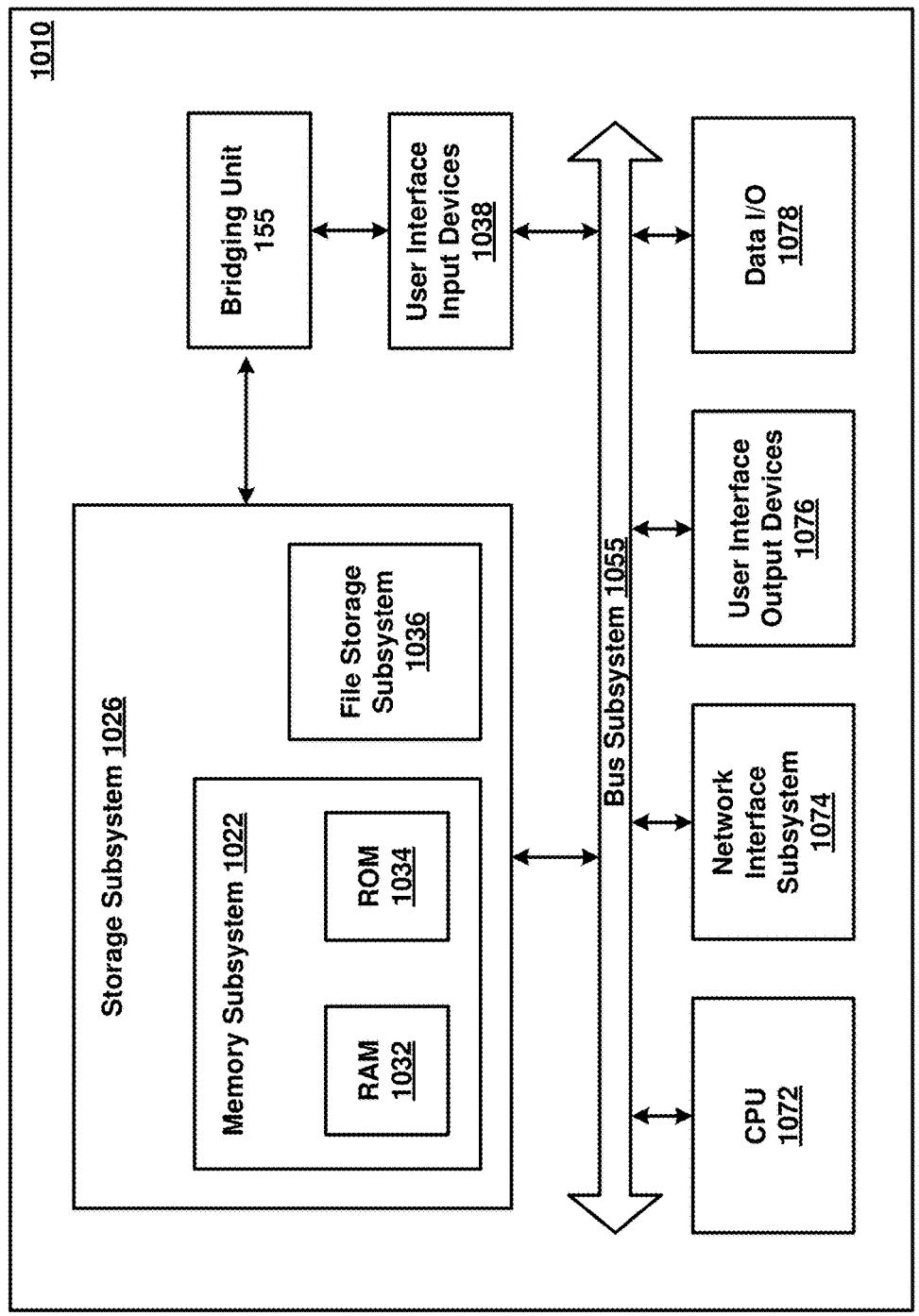
FIG. 10 is a simplified block diagram that can be used to manage remote test agents, such as a VTA or testing platform.

FIG. 10 is a simplified block diagram of a computer system 1000 that can be used to manage remote test agents, such as a VTA or testing platform. Computer system 1010 includes at least one central processing unit (CPU) 1072 that communicates with a number of peripheral devices via bus subsystem 1055. These peripheral devices can include a storage subsystem 1026 including, for example, memory devices and a file storage subsystem 1036, user interface input devices 1038, user interface output devices 1076, a network interface subsystem 1074, and data I/O 1078. The input and output devices allow user interaction with computer system 1010. Network interface subsystem 1074 provides an interface to outside networks, including an interface to corresponding interface devices in a communication network with other computer systems.

In one implementation, bridging unit 155 can be communicably linked to the storage subsystem 1026 and the user interface input devices 1038. User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), plasma, organic light-emitting diode (OLED), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1026 stores programming and data constructs that provide the functionality of some or all of the modules and methods described herein.

Memory subsystem 1022 used in the storage subsystem 1026 can include a number of memories including a main random access memory (RAM) 1034 for storage of instructions and data during program execution and a read only memory (ROM) 1032 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1026, or in other machines accessible by the processor.

Bus subsystem 1055 provides a mechanism for letting the various components and subsystems of computer system 1010 communicate with each other as intended. Although bus subsystem 1055 is shown schematically as a single bus, alternative implementations of the bus subsystem can use multiple busses.

Computer system 1010 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 1010 depicted in FIG. 6 is intended only as a specific example for purposes of illustrating the preferred embodiments of the present invention.

Many other configurations of computer system 1000 are possible having more or less components than the computer system depicted in FIG. 10.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

Some particular implementations and features are described in the following discussion.

Remote Testing

In one implementation, a disclosed method testing transport audio quality irrespective of tester location has a virtual test agent (VTA) selecting a Mobility Management Engine (MME) corresponding to an eNodeB positioned at a physical location served by a core network, for routing a second call through a Serving Gateway (SGW) assigned by the MME for audio communication with a tester terminus over a transport segment under test, whereby a tester can evaluate audio quality over the transport segment under test. The implementation also the VTA make a first call to a tester appliance. The implementation also has the VTA make the second call, over the transport segment under test, to the tester terminus by signaling the MME, wherein the tester terminus includes a person or User Equipment implementing audio evaluation. The implementation also bridges, by the VTA, the first and second calls by relaying audio during a test of subjective audio quality, whereby the bridging assures that the relayed audio in the second call continues to be relayed over the transport segment under test and not re-routed by core network components.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations, the tester appliance is remote from the VTA and the transport segment. In further implementations, the user and the tester appliance are separated from the VTA and the transport segment by more than 50 miles.

For some implementations, the user and the tester appliance are connected to the VTA by a VPN and through a SIP server.

For some implementations, the tester terminus includes a person that interacts with the tester appliance. In further implementations, the person sends audio to the tester appliance.

For some implementations, the tester terminus includes a test response application that interacts with the tester conducting the test. In further implementations, the test response application sends audio to the tester appliance.

For some implementations, the tester is a person that conducts an audio quality test. In further implementations, the relayed audio was generated by the person, and evaluated at the tester terminus.

For some implementations, the relayed audio was generated by a computer program and evaluated at the tester terminus.

Remote Core to Core Transport Testing

In one implementation, a disclosed method of testing audio quality of a transport segment between two core networks includes a first virtual test agent (VTA) selecting a Mobility Management Engine (MME) corresponding to an eNodeB positioned at a physical location served by a first core network for routing a second call, through a Serving Gateway (SGW) assigned by the MME for audio communication with a tester terminus, from the first VTA to a second VTA at a second core network over a transport-segment-under-test that connects the first and second core networks, whereby a tester can evaluate audio quality over the transport-segment-under-test. The implementation also has the first VTA making a first call to a tester appliance.

The implementation also has making the second call, over the transport-segment-under-test, to the second VTA implementing audio evaluation by signaling the MME. The implementation also bridging, by the VTA, the first and second calls by relaying audio during a test of subjective audio quality, whereby the relay through the SGW assures that the relayed audio in the second call is relayed over the transport segment under test the first VTA making a first call to a tester appliance. The implementation also has the first VTA making the second call, over the transport-segment-under-test, to the second VTA implementing audio evaluation by signaling the MME. The implementation also bridges, by the first VTA, the first and second calls by relaying audio during a test of subjective audio quality, whereby the relay through the SGW assures that the relayed audio in the second call is relayed over the transport segment under test.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations, the method further includes facilitating an audio call evaluation of the second call. In further implementations, the audio call evaluation of the second call involves determining a transmission quality rating by E-model. In further implementations, the tester appliance is operated by a human tester to evaluate audio quality. In even further implementations, the tester is geographically located in an area not served by the first core network and not served by the second core network.

For some implementations, first VTA makes the first call from a first emulated User Equipment (UE) and makes the second call from a second emulated UE.

Remote OTA Testing

In one implementation, remote testing over-the-air (OTA) audio quality using a test platform positioned at core network, the test platform comprising first and second cellular handsets and bridging logic that interconnects, controls, and bridges the first and second cellular handsets. The implementation includes triggering the bridging logic and causing the bridging logic to initiate a first call over the first cellular handset to a teste. The implementation also includes the bridging logic initiating a second call over the second cellular handset to a destination, wherein the second call is initiated over-the-air. The implementation also includes triggering the bridging logic and causing the bridging logic to initiate a first call over the first cellular handset to a tester. The implementation also includes the bridging logic initiating a second call over the second cellular handset to a destination, wherein the second call is initiated over-the-air, wherein the bridging logic and the first and second cellular handsets are positioned in a location that causes routing by a cellular network of the first call over a segment under test. The implementation also includes the bridging logic bridging audio between the first and the second calls, including relaying audio. The implementation also includes determining, by the tester, that the second call was established based on the relayed audio.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For some implementations, triggering the bridging logic establishes a bi-directional audio path from customer support to the destination.

For some implementations, the relaying involves relaying audio from customer support to the destination, followed by a response of relaying audio from the destination to customer support.

For some implementations, the tester is remote from the test platform. In some further implementations, customer support is also remote from the destination.

For some implementations, the audio relayed between the first cellular handset and the tester is transmitted OTA.

For some implementations, the first or the second cellular handset connected with the rest of the test platform through a USB connection. For other implementations, the first or the second cellular handset connected with the rest of the test platform through Bluetooth. For further implementations, the test platform may be configured with a Bluetooth component, comprising either built-in Bluetooth component or a USB adapter, that connects with the cellular handsets.

For some implementations, initiating the second call and bridging audio occurs at the same time. For some further implementations, "at the same time" is within 1 second. For some further implementations, "at the same time" is a time that permits the first cellular handset to hear the call setup between the second cellular handset and the destination.

Location-Based Routing

For some implementations, testing may also include a test for location-based routing. For some further implementations, testing may location-based routing may test Secure UserPlane Location services. For some even further implementations, testing routing may occur contemporaneously with audio testing.

For some implementations, testing by a tester may including measuring the quality of a first call with Key Performance Indicators; and if the KPIs do not exceed a threshold level of quality, selecting another tester and initiating the first call with the another tester.

For some implementations, the relayed media is media capable of being relayed by Real-time Transport Protocol.

Other implementations may include a non-transitory computer readable storage medium storing instructions executable by a processor to perform a method as described above. Yet another implementation may include a system including memory and one or more processors operable to execute instructions, stored in the memory, to perform a method as described above.

What is claimed is:

1. A method of remote testing over-the-air (OTA) audio quality using a test platform positioned at core network, the test platform comprising first and second cellular handsets and bridging logic that interconnects, controls, and bridges the first and second cellular handsets, the method including:
   triggering the bridging logic and causing the bridging logic to initiate a first call over the first cellular handset to a tester;
   the bridging logic initiating a second call over the second cellular handset to a destination, wherein the second call is initiated over-the-air;
   wherein the bridging logic and the first and second cellular handsets are positioned in a location that causes routing by a cellular network of the first call over a segment under test;
   the bridging logic bridging audio between the first and the second calls, including relaying audio; and
   determining, by the tester, that the second call was established based on the relayed audio.

2. The method of claim 1, wherein triggering the bridging logic establishes a bi-directional audio path from the tester to the destination.

3. The method of claim 1, wherein the relaying involves relaying audio from the tester to the destination, followed by a response of relaying audio from the destination to the tester.

4. The method of claim 1, wherein the tester is remote from both the test platform and the destination.

5. The method of claim 1, wherein the audio relayed between the first cellular handset and the tester is transmitted OTA.

6. The method of claim 1, wherein initiating the second call and bridging audio occurs at the same time.

7. The method of claim 6, wherein at the same time is a time that permits the first cellular handset to receive call setup audio between the second cellular handset and the destination.

8. A non-transitory computer readable storage medium impressed with computer program instructions to remotely test over-the-air (OTA) audio quality using a test platform positioned at core network, the test platform comprising first and second cellular handsets and bridging logic that interconnects, controls, and bridges the first and second cellular handsets, the instructions, when executed on a processor, implement a method comprising:
   triggering the bridging logic and causing the bridging logic to initiate a first call over the first cellular handset to a tester;
   the bridging logic initiating a second call over the second cellular handset to a destination, wherein the second call is initiated over-the-air;
   wherein the bridging logic and the first and second cellular handsets are positioned in a location that causes routing by a cellular network of the second call over a segment under test;
   the bridging logic bridging audio between the first and the second calls, including relaying audio; and
   determining, by the tester, that the second call was established based on the relayed audio.

9. The non-transitory computer readable storage medium of claim 8, wherein triggering the bridging logic establishes a bi-directional audio path from the tester to the destination.

10. The non-transitory computer readable storage medium of claim 8, wherein the relaying involves relaying audio from the tester to the destination, followed by a response of relaying audio from the destination to the tester.

11. The non-transitory computer readable storage medium of claim 8, wherein the tester is remote from both the test platform and the destination.

12. The non-transitory computer readable storage medium of claim 8, wherein the audio relayed between the first cellular handset and the tester is transmitted OTA.

13. The non-transitory computer readable storage medium of claim 8, wherein initiating the second call and bridging audio occurs at the same time.

14. The non-transitory computer readable storage medium of claim 13, wherein at the same time is a time that permits the first cellular handset to receive call setup audio between the second cellular handset and the destination.

15. A system including one or more processors coupled to memory, the memory loaded with computer instructions to remotely test over-the-air (OTA) audio quality using a test platform positioned at core network, the test platform comprising first and second cellular handsets and bridging logic that interconnects, controls, and bridges the first and second cellular handsets, the instructions, when executed on the processors, implement actions comprising:
   triggering the bridging logic and causing the bridging logic to initiate a first call over the first cellular handset to a tester;
   the bridging logic initiating a second call over the second cellular handset to a destination, wherein the second call is initiated over-the-air;
   wherein the bridging logic and the first and second cellular handsets are positioned in a location that causes routing by a cellular network of the second call over a segment under test;
   the bridging logic bridging audio between the first and the second calls, including relaying audio; and
   determining, by the tester, that the second call was established based on the relayed audio.

16. The system of claim 15, wherein triggering the bridging logic establishes a bi-directional audio path from the tester to the destination.

17. The system of claim 15, wherein the relaying involves relaying audio from the tester to the destination, followed by a response of relaying audio from the destination to the tester.

18. The system of claim 15, wherein the tester is remote from both the test platform and the destination.

19. The system of claim 15, wherein the audio relayed between the first cellular handset and the tester is transmitted OTA.

20. The system of claim 15, wherein initiating the second call and bridging audio occurs at the same time.

\* \* \* \* \*